United States Patent [19]

Lyman et al.

[11] Patent Number: 5,193,700
[45] Date of Patent: Mar. 16, 1993

[54] CARGO CONTAINER

[76] Inventors: H. Scott Lyman, 4300 Albert Cir., Lake Oswego, Oreg. 97035; Masanori Tsuchiya, 915-123 Takane-cho, Chiba City, Chiba pref., Japan, 280-01

[21] Appl. No.: 759,540

[22] Filed: Sep. 13, 1991

[51] Int. Cl.⁵ .............................................. B65D 85/00
[52] U.S. Cl. .................................... 220/1.5; 200/386; 200/389
[58] Field of Search ............... 206/389, 391, 393, 394, 206/83, 386; 220/1.5

[56] References Cited

U.S. PATENT DOCUMENTS

| | | |
|---|---|---|
| 2,494,404 | 1/1950 | Nixon . |
| 3,091,348 | 5/1963 | Neuhauser . |
| 3,752,086 | 8/1973 | Smith . |
| 4,132,310 | 1/1979 | Dorsch ................................ 200/386 |
| 4,311,420 | 1/1982 | Hendricks et al. . |
| 4,406,366 | 9/1983 | Torshee ............................... 206/386 |
| 4,574,105 | 3/1986 | Donovan . |
| 4,768,418 | 9/1988 | Blommer et al. . |
| 4,805,794 | 1/1989 | Tsuchiya et al. ................... 200/389 |
| 4,901,855 | 2/1990 | Furukawa . |
| 4,941,784 | 7/1990 | Flament . |
| 4,976,365 | 12/1990 | Seo . |

Primary Examiner—Joseph Man-Fu Moy
Attorney, Agent, or Firm—Kolisch Hartwell Dickenson McCormack & Heuser

[57] ABSTRACT

An improved container storing, shipping and handling rolling and shifting cargo is disclosed. Preferably, the container includes a base and a dome-like lid attachable to it. The base is formed with plural linear extending recesses having plural holes arranged in an array for receiving corresponding projections of plural chocks. Each chock has a chock base from which extend plural spaced projections for mating with the container's base. Each chock also includes a first working expanse extending upwardly at an oblique angle for restraining rolling cargo, a second working expanse extending vertically for restraining shifting cargo, and a third working expanse extending upwardly at an oblique angle different from that of the first working surface, the chock base and the working expanses forming a framing border structure defining the chock's open interior region. The dome-like lid includes a cover region with downwardly extending angular corner posts being formed with flanges for receiving interchangeably fastenable panels, the posts and the panels forming the lid's sidewalls. The panels are preferably made of an insulative polyaramid fiber material. The dome-like lid is equipped with a multi-positionable lift arm for removing the lid from the base.

13 Claims, 4 Drawing Sheets

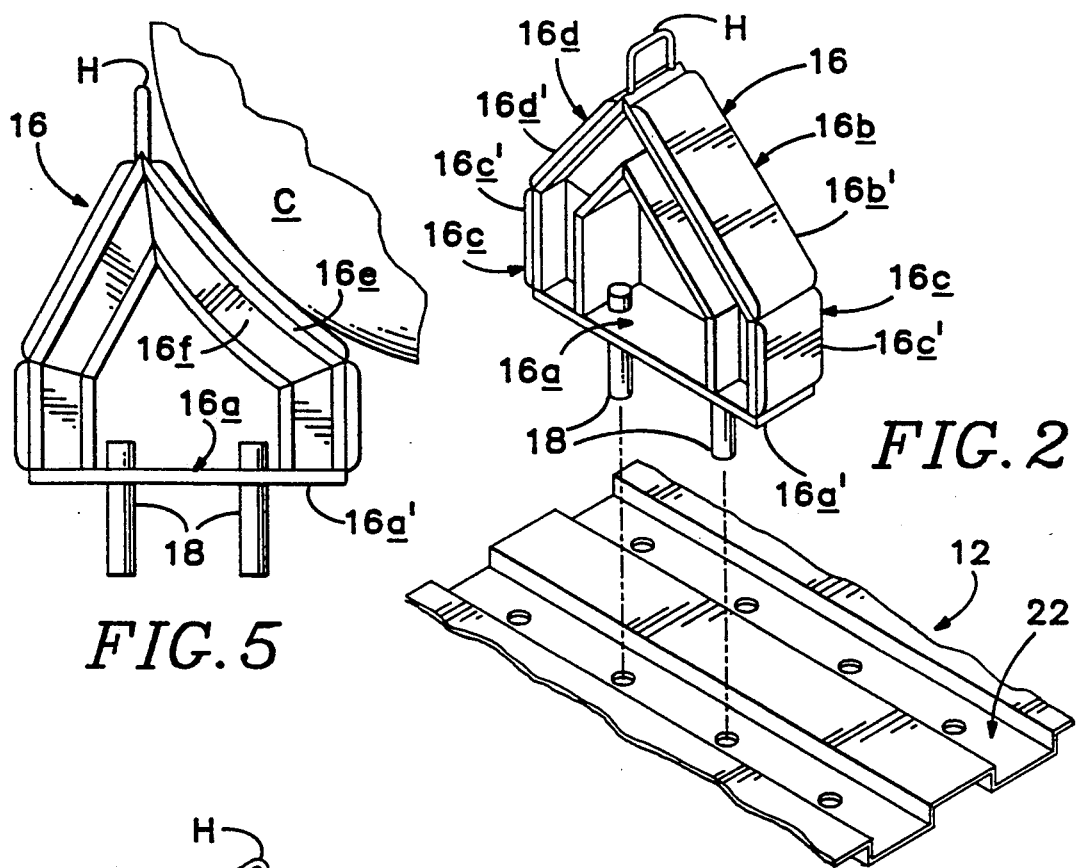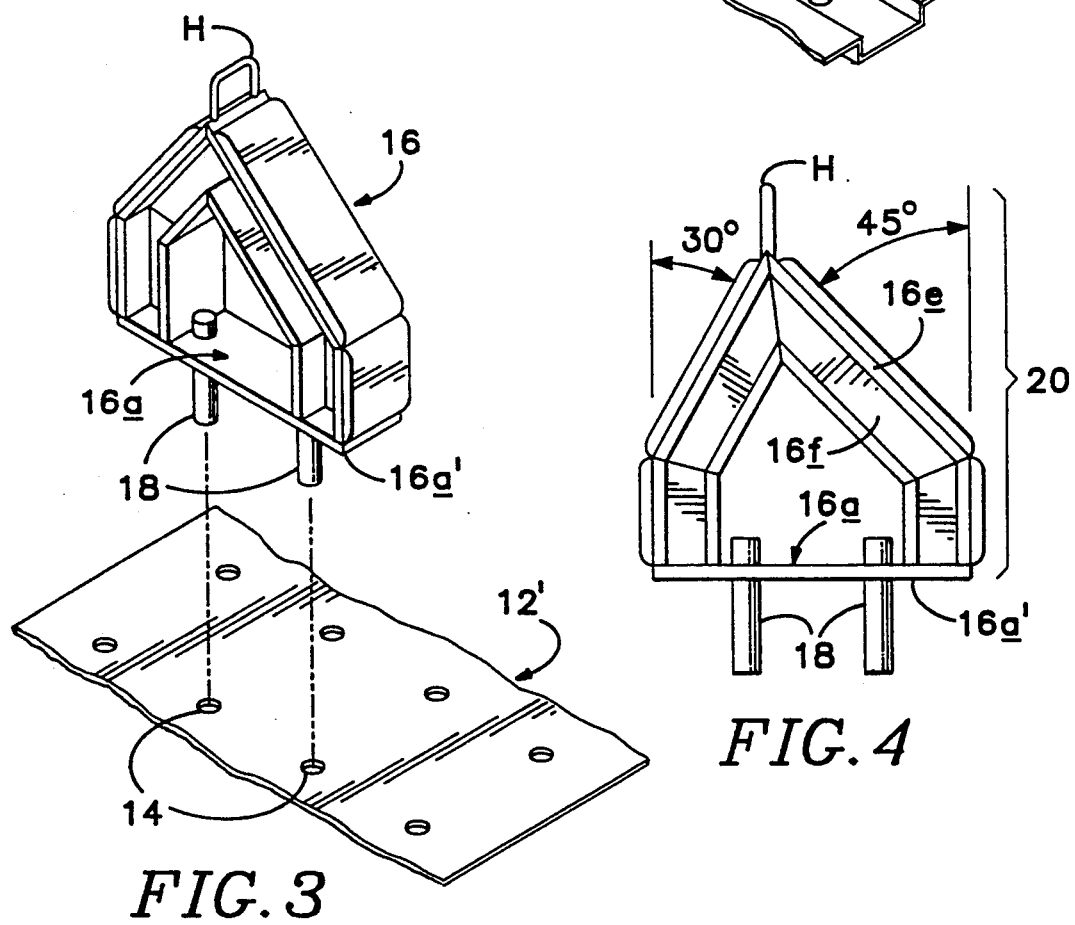

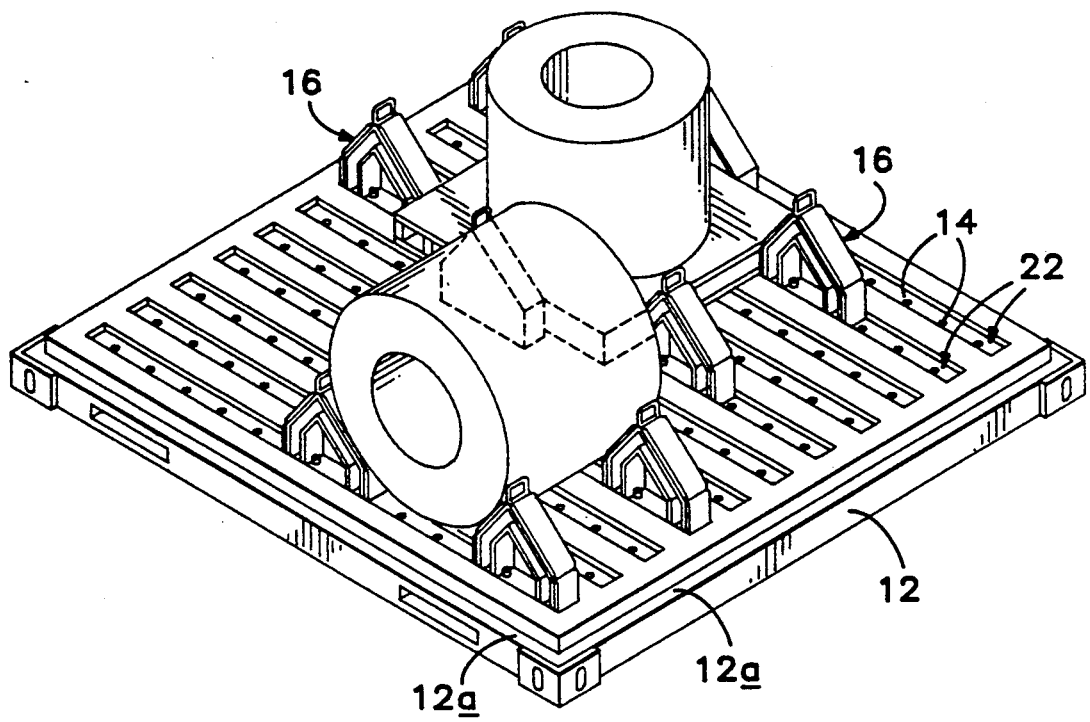
FIG. 6
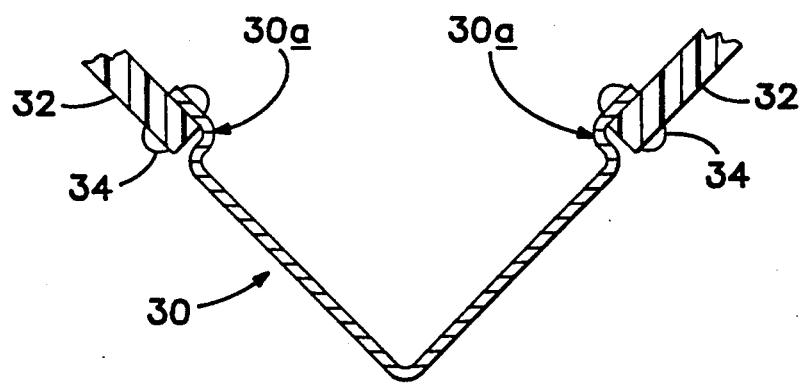
DETAIL A

CARGO CONTAINER

BACKGROUND AND SUMMARY OF THE INVENTION

This invention relates generally to containers for storing and shipping heavy cargo that is subject to rolling and/or shifting in transport. More particularly, it concerns an improved container that includes a dome-like lid and a base with plural restraining chocks that easily may be positioned on it for a variety of cargo arrangements, and that provides a lift arm that allows removing of the dome-like lid from the base.

Cargo containers are known that provide for storage and shipping of heavy cargo that is subject to rolling. Cargo containers also are known that provide for the stable storage and shipping of heavy cargo that is subject to sliding or other shifting movement. Many such containers are equipped with restraining blocks having inclined and concavely curved or vertical planar working surfaces that are attachable to the container's base and/or lid in fixed positions with fasteners. Such containers are not easily configured for accommodating heavy and laterally shifting cargo such as sheet metal, e.g. heavy gauge steel, which typically is prepared for shipping and storage by rolling it in one or more cylindrical coils of various sizes.

Most such containers rely for handling upon pallet-like bases having rectangular-tubular receivers for fork-lift handling. Often the weight of such containers is as great as that of their cargo, because the containers themselves are made of heavy gauge steel.

In addition, such conventional steel cargo containers do not have insulative qualities. It would be desirable to have insulated cargo carriers for shipping steel coils to reduce the possibility of rust forming on the coils due to moisture that collects on them when the loaded, conventional cargo container is placed in a relatively cold transport vehicle such as the hull of a ship. Moisture collects on the steel coils due to condensation caused by an elevated-temperature condition within the container (the coils are at elevated temperatures when placed in such containers at steel manufacturing facilities) and a relatively low-temperature condition in the ship's hull. As a result of the "warm inside-cold outside" condition with respect to the loaded cargo container in the ship's hull, gaseous water in air condenses to a liquid on inside surfaces of the container and on the coil itself. Water formed on the inside surfaces of the container, particularly the inner surface of the lid, falls onto the coil. Undesirably, rust can form on the coil from such moisture.

Accordingly, it is a principal object of the invention to provide an improved multi-purpose container that is highly configurable for various shapes and sizes of cargo.

Another object is to provide such a container with a base that includes plural recesses formed with plural openings into which corresponding projections of plural, multi-positionable and -orientable chocks easily and securely may be fitted.

Yet another object of the invention is to provide such chocks with a bottom surface positionable within such a recess and with two or more working surfaces having different inclinations from the horizontal for restricting lateral movement of cargo of various shapes and/or sizes.

It is another important object to provide a container the sidewalls of which are thermally insulative for reducing the possibility of rust forming on metallic cargo.

One more object is to provide the dome-like lid of such a container with an improved lift mechanism for container stackability and ease of handling.

Still another object of the invention is to provide a container that is durable yet relatively lightweight, and is manufacturable cost-effectively.

Briefly summarizing the preferred embodiment of the invention, the cargo container is rectilinear with a rectangular base and a dome-like lid attachable to it. The base has formed therein plural parallel linearly extending recesses having plural regularly spaced openings formed therein. The dome-like lid includes a planar horizontal cover that is coextensive with the base. Extending downwardly from the cover are angular corner posts with flanges for receiving interchangeably fastenable panels. The panels are preferably made of an insulative polyaramid material. The corner posts and panels thus form sidewalls that extend downwardly from the cover to removably connect with the perimeter of the base. The dome-like lid is equipped with a lift arm that normally assumes an inclined orientation for grappling by the hook of a lifting device and, when so engaged, pivots to a vertical deployment position for lifting and removing the lid from the base. Also, the lift arm pivots into a horizontal stowage position when another container is stacked on top of such a container.

The invention also includes plural chocks for restricting lateral movement of the cargo, each chock being dimensioned to be received partially within one of the recesses. Each chock includes a bottom surface for engagement with a lower support region of a recess, the bottom surface having plural spaced, depending projections for insertion into corresponding openings of the recess. Each chock has at least one first working surface extending upwardly at an oblique angle to the chock's bottom surface for resistively confronting the curved outer surface of rolling cargo and at least one second working surface extending vertically for resistively confronting a vertical surface of relatively stationary cargo. The chocks can be positioned and oriented in various ways relative to the base to accommodate a wide variety of shapes and sizes of heavy cargo.

These and other objects and advantages of the invention will become more readily apparent by reading the following description and by referring to the accompanying drawings.

Figure 1:
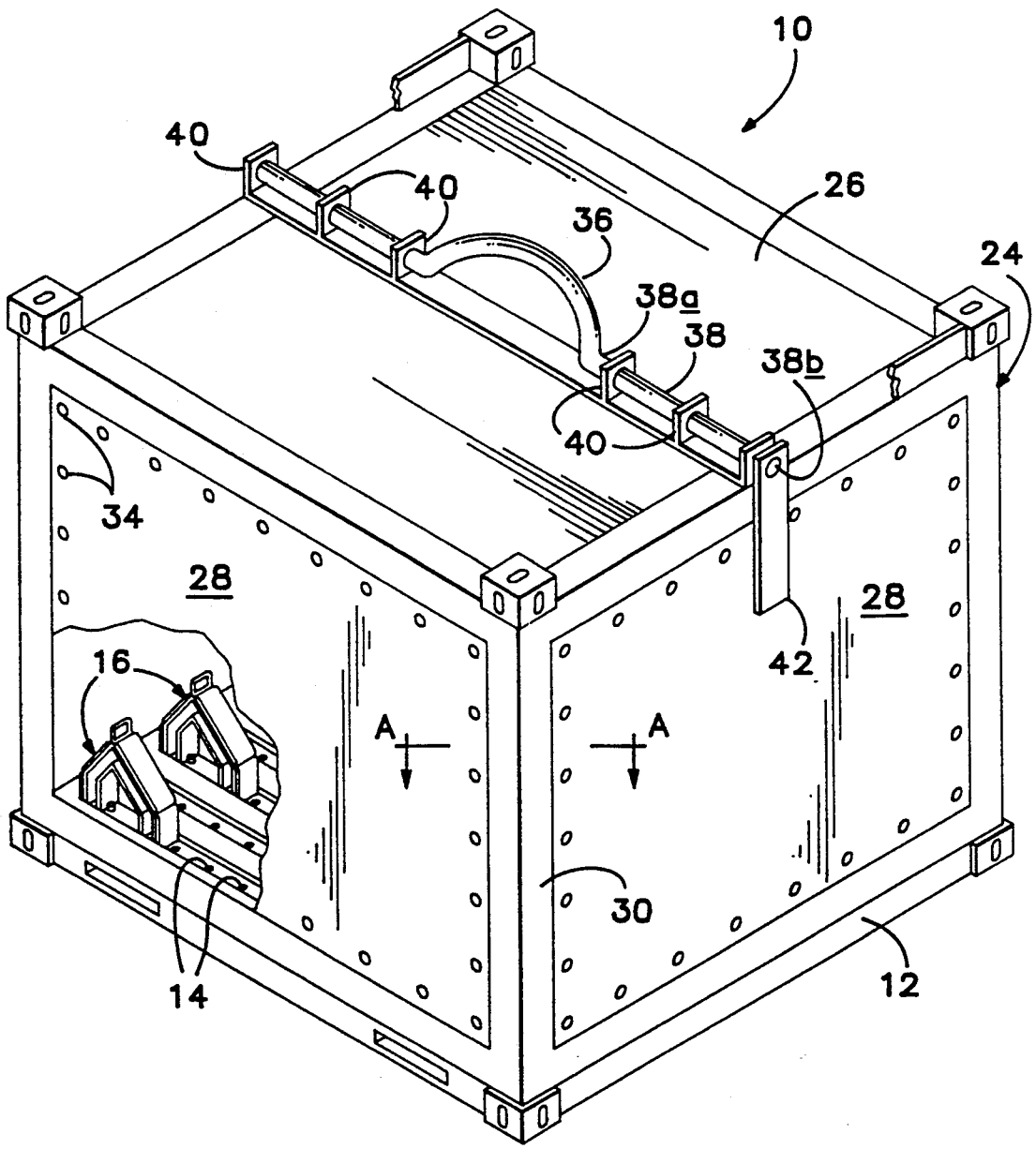
FIG. 1 is an isometric view of the invention made in accordance with its preferred embodiment.

Detail A is a fragmentary top plan view of the preferred corner-and-panels construction of the container taken generally along the lines A—A of FIG. 1.

FIG. 2 is an enlarged isometric view of one of the chocks shown in FIG. 1.

FIG. 3 is similar to FIG. 2, except that it shows a chock received in a base that is made in accordance with a proposed modification to the preferred embodiment of the invention.

FIG. 4 is a side elevation of the chock shown in FIGS. 2 and 3.

FIG. 5 is similar to FIG. 4, but shows a chock flexing under load.

FIG. 6 is an isometric view of the preferred embodiment corresponding to that of FIG. 1, but with the dome-like lid removed to show the container loaded with cargo.

Figure 7A:
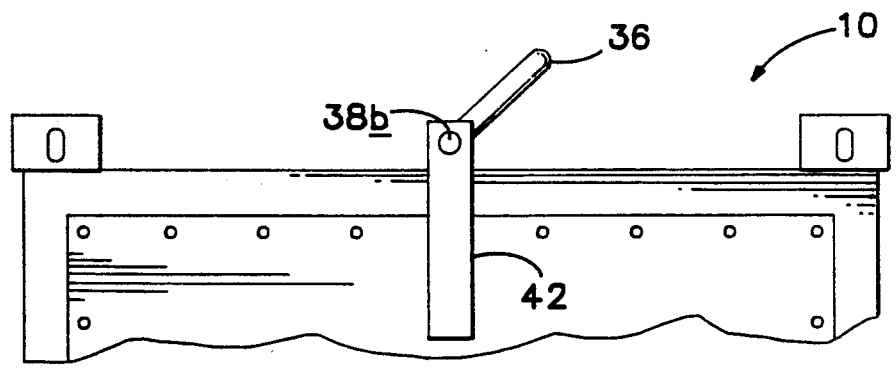
Figure 7B:
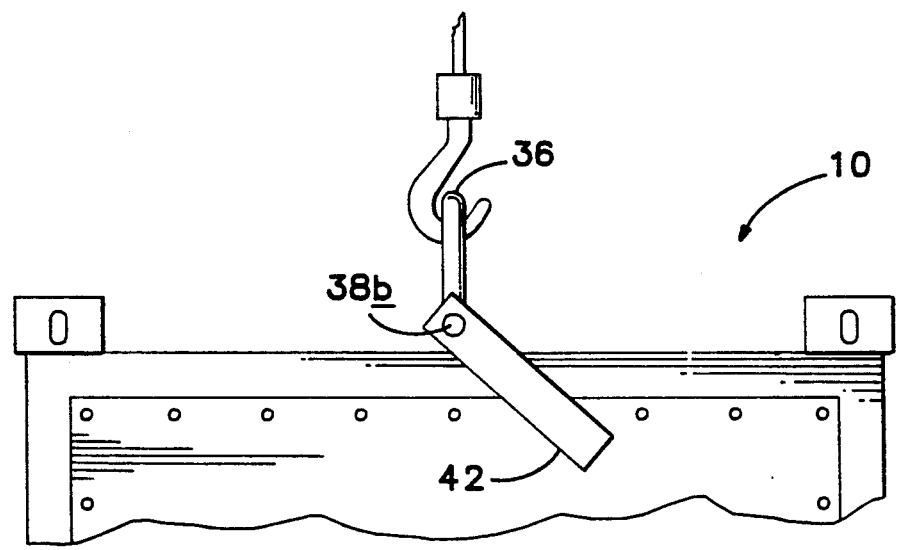
Figure 7C:
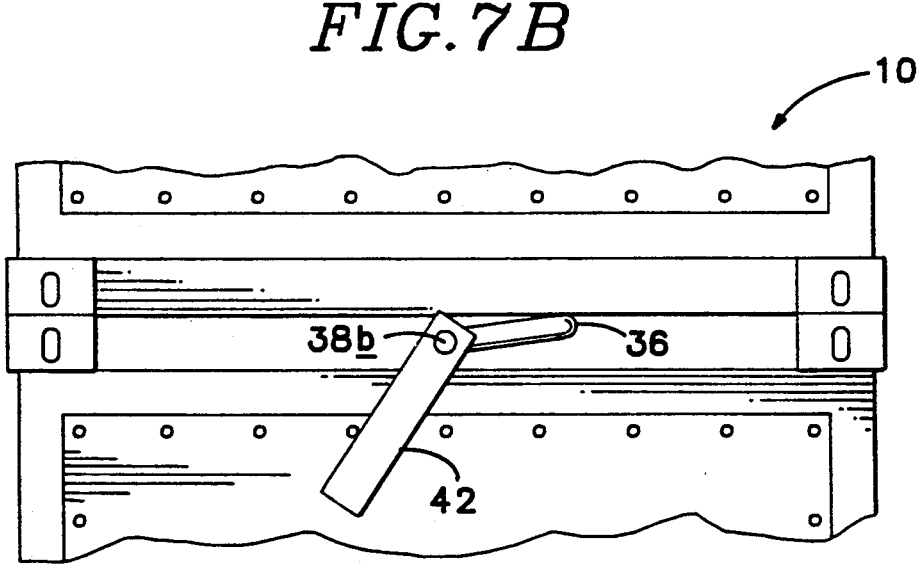

FIGS. 7a through 7c are a series of side elevations of the lift arm of FIG. 1, showing various operational positions.

DETAILED DESCRIPTION OF THE PREFERRED EMBODIMENT referring initially to FIG. 1, the invented multi-purpose cargo container is shown in isometric view at 10. Container 10 includes a generally planar container base or deck 12 including plural openings 14 arranged therein in a defined array such as the parallel linear array shown. Container 10 also includes plural chocks 16, which may be oriented and positioned at will in cooperative association with container base or deck 12 to resist rolling and sliding movement of cargo stored and shipped in container 10.

Turning now to FIGS. 2 through 5, each chock 16 may be seen to have a generally planar chock base 16a having a bottom surface 16a' for mating container base 12 in the vicinity of openings 14. Each chock 16 also has a t least one load bearing or working expanse 16b having a working surface 16b' extending upwardly at a first oblique angle, e.g. preferably approximately 45°, to bottom expanse 16a and bottom surface 16a'. Each chock 16 is equipped with at least two spaced depending projections 18 dimensioned to be receivable within corresponding ones of openings 14 in container base 12, as shown in FIG. 2. Each chock 16 preferably has at least one second working expanse 16c having a second working surface 16c' extending substantially vertically, or at a substantially right angle to chock base 16a and bottom surface 16a' of chock 16. Finally, each chock 16 preferably has a third load bearing or working expanse 16d having a third working surface 16d' extending upwardly at a second oblique angle, e.g. preferably approximately 30°, the second oblique angle being different from that fist oblique angle at which working expanse 16b and working surface 16b' extend.

As best may be seen by reference to FIGS. 2 and 4, chock base 16a is configured for its retainable positioning relative to cargo-support deck 12 by the provision of a pair of projections or elongate members 18 extending through chock base 16a from an upper surface thereof to a desired depth below general planar bottom surface 16a'. Elongate members 18 are receivable within corresponding openings 14 formed in deck 12, and retain the position of chock 16 relative thereto, Members 18, which in the preferred embodiment of the invention project outwardly from a chock's bottom surface 16a' into holes formed in the recesses of container base 12, although it will be appreciated that a reverse arrangement of projections and holes is possible. In other words, the holes opening inwardly may be formed in the bottom surfaces of the chocks and the members may project outwardly from the bottom regions of the recesses. In either case, the combination of projecting members 18 and corresponding holes or openings 14 may be seen to define means for securing the position and orientation of each chock 16 relative to container base 12.

Extending upwardly from chock base 16a is what may be thought of as chock structure 20 including at least one, and preferably two, bearing expanses such as bearing expanse 16b, Bearing expanse 16b may be seen by comparison of FIGS. 4 and 6 to have a load-free, substantially linear shape (refer to FIG. 4) that is conformable to a load-bearing accurate shape with cargo C impinging on it (refer to FIG. 6). Thus, chock base 16a and chock structure 20 form what is preferred to herein as a framing border structure defining an open interior region.

Bearing expanse 16b is conformable to the load-bearing shape with cargo C impinging on it because of the framing border structure of chock 16 and the rigid resilient structure of bearing expanse 16b itself. Preferably, all working expanses of chock 16, including working expanses 16b, 16c, 16d are I-beams rigidly joined at their ends and with chock base 16a by known seam welding techniques. The I-beams may be made of any suitably strong and resilient material such as tempered steel. Preferably, working surfaces 16b', 16c' 16d' are a layer of thick rubber that provides anti-abrasion and shock absorbing qualities to chock structure 20. A handle H is provided at the apex of chock structure 20 for the convenient lifting, handling and placement of chock 20 relative to base or deck 12. As best can e seen from FIGS. 2 and 4, preferably I-beam-structured expanse 16b includes a generally planar outer working expanse 16e and an inwardly extending web structure 16f that reinforces outer working expanse 16e.

Accordingly, it may be seen that an alternative to the I-beam construction illustrated in FIGS. 2 through 5 would be a so-called T-beam construction, which would also provide suitably rigid, conformably load-bearing structure including a planar outer working expanse reinforced by an inwardly extending web structure. Those of skill will appreciate that, within the spirit of the invention, other cross sectional configurations are possible that provide the required rigidity and resilience to render bearing expanse 16b (and, if desired, also bearing expanses 16c, 16d) load-bearing shape conformable when cargo impinges on it. Because a bearing expanse such as bearing expanse 16b is made of rigid, yet resilient, material, it returns to its load-free generally linear shape after cargo is removed from impingement thereon, and returns to the shape that is illustrated in FIG. 4.

Those skilled in the at will appreciate the relatively large scale of some of the features of the present invention. For example, in the illustrated embodiment of the invention each chock 16 is approximately a foot high and weighs approximately 45 pounds. It will be appreciated that container base 12 is preferably of a frame and panel construction some details of which are omitted herein of the sake of clarity and brevity. For example, conventional corner castings meeting applicable common carrier and maritime regulatory requirements are illustrated in FIGS. 1 and 6 (as well as other figures), but are not described herein as they form no part of the present invention. It will be be appreciated that chock base 16a, bearing expanses 16b, 16c, 16d and projections 18 may be made of any suitably durable, rigid and/or resilient material, and that, within the spirit of the invention, chock 16 might be a unitary casting.

FIG. 3 shows a chock and deck combination representing a proposed modification to the preferred embodiment of container 10 in which a planar deck 12' having no recesses might also be used to advantage. While the recesses shown in FIG. 2 are advantageous in laterally supporting chock 16 when it is received at least partially therein as shown in FIGS. 1 and 6, those of skill in the art will appreciate that a flat deck 12' having no recesses, when equipped with invented plural chocks 16, also would provide for the steadying of cargo in accordance with the invention.

Another advantage flows from the framing border structure preferably employed in chock 16: the structure is believed uniquely to provide the structural integrity required of projections or elongate members 18, which preferably are solid and cylindrical and are snugly fitted through holes formed in chock base 16a and then are seam welded around the holes' peripheries along the upper surface of chock base 16a by known techniques. By properly dimensioning the thickness of chock base 16a and the diameter of the holes formed therein, elongate members 18 securely can be fixed to extend there through and to extend downwardly thereform substantially parallel with one another to accommodate the fitting of chock 16 in a desired location and orientation on deck 12 and to resist the substantial lateral forces under the shifting weight of cargo that otherwise might shear members 18 from chock base 16a were chock 16 of more conventional solid construction.

Referring back to FIG. 1 and referring also to FIG. 6, the location of chocks 16 securely can be fixed relative to container base 12 against lateral movement therebetween. As may be seen by brief reference to FIG. 6, chocks 16 securely fixed to base 12 resist rolling, sliding or other shifting movement of cargo within container 10, yet are highly configurable within container 10 for various shapes, sizes and inclinations of cargo because chocks 16 easily can be placed and oriented relative to base 12. Illustrative arrangements of plural spaced ones of pair of chocks 16 are seen from FIG. 6 to include arrangements wherein ones of the pair are in a desired spaced relation with their first working surfaces oriented inwardly of the container, or away from the peripheral edge of container base 12 to resist potential rolling movement of cargo supported by base 12. Others include arrangements wherein ones of the pair are in a desired spaced relation with their second working surfaces oriented inwardly of the container to resist sliding movement of cargo such as the palletized cargo shown in FIG. 6.

Referring still to FIGS. 1 and 6, at least some and preferably all of plural openings 14 are arranged within one or more recesses 22 formed in base 12, with each recess 22 being dimensioned for receiving at least one chock 16 partially therein with its projections 18 received within corresponding openings 14. In accordance with the preferred embodiment of the invention, container base 12 includes plural recesses 22, each extending linearly and in parallel with one another in base 12. By this arrangement of plural openings 14 within recesses 22 partially receiving chocks 16 therein, and with projections 18 securely fitted in corresponding openings 14, chocks 16 may be seen to assume any of plural positions and orientations relative to container base 12. Of course, chocks 16 yet are manually removable from and replaceable onto container base 12 when desired, by lifting, moving and placing them via rigid grippable handles H, so that virtually an infinite variety of chock or chock pair placements are possible.

FIG. 6 perhaps best shows how plural, spaced recesses 22 extend preferably linearly and in parallel with one another in base 12, and how plural openings 14 are arranged therein in a defined array. Each recess 22 has a substantially planar support region in which openings 14 are formed for supporting chock bases 16a of plural chocks 16, with bottom surfaces 16a' of chocks 16 mating container base 12 in the vicinity of openings 14 for receiving therein projections 18. By providing each chock 16 with at least two projections 18, not only can chocks 16 be positioned on deck 12, but they also can be oriented relative thereto by the receiving of projections 18 within corresponding ones of openings 14. Plural orientations of chock 16 relative to recesses 22 and relative to base 12 are made possible by the provision of pairs of projections 18 and corresponding pairs of openings 14 of uniformly equal spacing. Thus, projections 18 define means for securing the position and orientation of chocks 16 relative to base 12.

A dome-like lid 24 that preferably forms a part of invented heavy cargo container 10 is described by reference to FIG. 1 and enlarged fragmentary Detail A. Lid 24 cooperates with chock-equipped base or deck 12 to substantially completely enclose cargo within container 10 during shipping and handling. Lid 24 preferably includes a preferably planar and rectilinear cover 26 that is coextensive with deck 12, whereby the lateral extents of deck 12 and cover 26 define a lateral perimeter of container 10. Cover 26 preferably is of corrugated steel construction, and may include reinforcing ribs (not shown) extending across between opposite peripheral framing members. Extending downwardly from cover 26, toward the periphery of deck 12 when lid 24 is used therewith, are four generally planar sidewalls 28 that elevate cover 26 above deck 12 to a desired height, based upon the size of cargo to be contained.

Sidewalls 28 preferably are of frame and panel construction, whereby four identical corner posts 30 made, for example, of angle iron as indicated in Detail A extend vertically between similar upper and lower angle-iron frames defining the periphery of cover 26 and the lower terminal edge of lid 24 and whereby preferably interchangeable panels 32 are fastenable at flanged edges 30a of the angle-iron frames entirely around the rectilinear peripheral edge of panels 32. Detail A shows a typical corner construction whereby rivets 34 to secure panels 32 along their edges to corresponding plural holes (not shown) formed in flange edges 30a.

This preferred frame and panel construction of lid 24 provides certain advantages including the replaceability and interchangeability of panels 28, which may be made of sheet metal or, more preferably, may be made of polyaramid filament material. The use of frame and panel construction, and the use of polyaramid filament panels, render lid 24 versatile, durable and lightweight for ease in its frequent lifting and handling. Importantly, the use of polyaramid panels also renders lid 24 substantially thermally insulative, thereby reducing the adverse effect on cargo contained within container 10 of thermal gradients that might otherwise produce condensation within container 10 and rust on cargo C.

The invention may be seen as an improvement in containers including a base for supporting heavy cargo, the improvement being the provision of lid 24 removably connected therewith including plural sidewalls 28 for extending upwardly from the perimeter of the base and also including a generally planar cover 26 joining sidewalls 28 to form an enclosure when lid 24 is connected therewith. As will be seen by reference to FIGS. 7A through 7C, container 10 having such invented improvement including a planar cover is configured for supporting another similar container atop lid 24 in a vertical stacking arrangement.

Another way to see the improvement is to describe it as improving a container that has a base for supporting heavy cargo, which base generally defines the container's perimeter. By this improvement, lid 24 is provided with sidewalls 28 that extend upwardly and are joined by cover 26 at an elevation substantially above the container's base, thereby forming an enclosure for cargo supported by the base. Importantly, the invented sidewalls include regions, e.g. panels 32, that are constructed of heat- or thermally insulative polyaramid material, providing the anti-rust protection to the container's cargo that is alluded to herein.

Considering for a moment the ease with which deck 12 may be lifted, handled and loaded with cargo, it will be appreciated that container 10 is constructed for extremely heavy cargo, e.g. its capacity is greater than 50,000 pounds. Such weight ultimately is borne by deck 12—whether via plural chocks 16 in the case of steel coil rolls or other cylindrical cargo C elevated above deck 12 by the chocks or directly in the case of palletized or other rectilinear cargo (refer briefly to FIG. 6)—recesses 22 of which also act to strengthen it. Once cargo is loaded, and it is desired to move container 10, such is easily accomplished by the use of convention forklift equipment, by the provision as shown in FIGS. 1 and 6 of rectangular-tubular receivers within deck 12 dimensioned and spaced to receive a forklift's tines. In the preferred embodiment of the invention, deck 12 alone weighs approximately 2000 pounds. It will be understood that other suitable equipment may be used, e.g. a spreader, to handle unloaded or loaded decks 12 or entire containers 10.

The provision of dome-like lid 24 that is removably connectable with deck 12 makes it possible to access deck 12 from any side or above it for easy, usually manually assisted, cargo loading using conventional lift equipment. After deck 12 is securely loaded with cargo, which securement may be assisted by convention tie down means, lid 24 may be lifted and placed atop deck 12, with the terminal bottom edge of lid 24 formed by its sidewalls resting on a peripheral shoulder region 12a of deck 12 (refer to FIG. 6). Lid 24 may be removably secured to deck 12 by any suitable means such as conventional locking pins extending through plural aligned hole pairs formed therein, for example, at each corner.

When it is desired to gain access to cargo loaded within container 10, lid 24 is made to be easily lifted from deck 12, thereby leaving generally planar deck 12 loaded or loadable with cargo C from the top and all sides thereof. While lid 24 might be equipped with a conventional lift arm to assist in its handling and placement, the present invention provides a further improvement involving a lid-handling mechanism. The invented lift mechanism is an assembly including a graspable arm 36 that may be in the form of a U-shaped member to which a cylindrical shaft 38 is rigidly connected on a first end 38a thereof, with shaft 38 being rotatably anchored to lid 24 by plural aligned spaced brackets 40. Thus, shaft 38 rotatably received within brackets 40 defines an axis about which arm 36 may be pivoted. Shown for completeness but only fragmentarily in FIGS. 1 and 7A through 7B are end rails extending between opposite corner castings that act to reinforce the welded joiner between lid 24 and the lift mechanism.

Importantly, shaft 38 has rigidly connected to another end 38b thereof a weighty member 42 that extends radially outwardly from shaft 38 preferably at a right angle to the pivotal axis of shaft 38. As may be seen by reference to FIGS. 1 and 7A, member 42 of its own substantial weight acts normally to pivot lift arm 36 into a first inclined position providing clearance above lid 24 for grasping of lift arm 36 and lifting of lid 24 by external lift means such as a grappling hook (not shown in FIGS. 1 and 7A, but shown in FIG. 7B). Preferably, as may be seen better from FIG. 7A, lift arm 36 extends at an inclined angle of approximately 45° from cover 26 in this normal position of the lift mechanism.

Turning now to FIG. 7C, when a similar cargo container (the upper container in FIG. 7C) is stacked atop lid 24 of invented container 10 (the lower container in FIG. 7C), lift arm 36 is temporarily moved into a second position in which it lies generally in the horizontal plane of the cover, or cover region, 26 of lid 24 by the base or deck of the other container. Thus, container 10 in its preferred embodiment is vertically stackable, yet its lid is still easily removable due to the normally inclined orientation of pivotable lift arm 36.

Turning finally to FIG. 7B, it may be seen that lift arm 36 is temporarily pivotally moveable into a third position in which it lies generally in a vertical plane. Lift arm 36 is moved into this third position when it is grasped by external lift means including, for example, a grappling hook as shown. In this third position, lift arm 36 enables the lifting and removal from deck 12 of lid 24, which when made in accordance with the preferred embodiment described herein weighs only approximately 700 pounds (including the lift mechanism) and thus is substantially lighter than base 12, thereby providing container 10 with a desirably low and stable center of mass.

Those skilled in the art will appreciate that lift arm 36 returns automatically to its normal, or at-rest, first inclined position upon its release from external lift means. Accordingly, upon a desired placement of lid 24, and such release, lift arm 36 again assumes the position shown in FIG. 7A from which lid 24 easily may be lifted from its container 10 or another container easily may be stacked thereon.

Accordingly, while the invention has been shown and described with reference to a preferred embodiment, it will be understood by those skilled in the art that changes might be made thereto without departing from the spirit of the invention, yet while achieving many of the advantages of the invention.

It is claimed and desired to secure by Letters Patent:

1. A cargo container comprising:
a generally planar base including plural openings arranged in a defined array, and
plural chocks each having a bottom surface for mating with said base in the vicinity of said plural openings and at least one working surface extending upwardly at an oblique angle to said bottom surface, each of said chocks being equipped with at least two projections receivable within corresponding ones of said plural openings thereby securely to fix the location of each of said chocks relative to said base against lateral movement under the shiftable weight of cargo stored in said container.

2. The container of claim 1, wherein at least plural ones of said plural openings are arranged within a recess of said base, said recess being dimensioned for receiving at least one of said plural chocks at least partially therein.

3. The container of claim 2, wherein said plural openings are arranged such that each of said chocks is receivable within said recess with said two projections receivable within said corresponding openings in plural orientations of said chocks relative to said base.

4. The container of claim 2, wherein said base includes plural ones of said recesses, with said plural recesses extending linearly and in parallel with one another in said base.

5. A cargo container comprising:
a generally planar base including plural spaced linear recesses formed in said base, each of said recesses having a substantially planar support region;
plural chocks each being dimensioned to be received at least partially within one of said recesses, each chock having a bottom surface for engagement with said support region, a first working surface extending upwardly at an oblique angle to said bottom surface of said chock, and a second working surface extending upwardly at a substantially right angle to said bottom surface of said chock; and
means for securing the position and orientation of each of said chocks relative to said base, said securing means including plural spaced members projecting outwardly from one of said bottom surface and said recess into plural spaced holes opening inwardly respectively in one of said recess and said bottom surface.

6. The container of claim 5, wherein at least one pair of chocks is received within one of said recesses in a desired spaced relation with said first working surfaces thereof oriented inwardly of the container to resist rolling movement of cargo supported by said base.

7. The container of claim 5, wherein at least one pair of chocks is received within one of said recesses in a desired spaced relation with said second working surfaces thereof oriented inwardly of the container to resist sliding movement of cargo supported by said base.

8. The container of claim 5, wherein at least one of said chocks further has a third working surface extending upwardly at an oblique angle to said bottom surface of said chock.

9. The container of claim 8, wherein said first and third working surfaces extend at different predetermined angles relative to said bottom surface.

10. A cargo container comprising:
a generally planar base including plural openings arranged in a predetermined array within plural spaced linear recesses formed in said base, said base generally defining a perimeter of the container;
a lid removably connectable with said base, said lid including plural sidewalls for extending upwardly from the perimeter of said base and a cover joining said sidewalls to form an enclosure when said lid is connected with said base, said lid when removed from said base providing access to the interior of said container for loading and unloading cargo onto and from said base;
at least one pair of chocks received at least partially within one of said recesses of said base, each of said chocks of said pair of chocks having a bottom surface for engagement within a corresponding one of said recesses, a first working surface extending upwardly at an oblique angle to said bottom surface of said chock, and a second working surface extending upwardly at a right angle to said bottom surface of said chock, said bottom surface of each of said chocks being equipped with plural projections receivable within corresponding plural openings thereby to securely fix the location and orientation of each of said chocks of said pair of chocks relative to said recessed region in said base and in spaced relationship with one another.

11. The container of claim 10, wherein said one pair of chocks is received within said one recess in a desired spaced relation with said first working surfaces thereof oriented inwardly from said perimeter of the container to resist rolling movement of cargo supported by said base.

12. The container of claim 10, wherein said one pair of chocks is received within said recess in a desired spaced relation with said second working surfaces thereof oriented inwardly of the container to resist sliding movement of cargo supported by said base.

13. The container of claim 10, wherein at least one of said chocks further has a third working surface extending upwardly at an oblique angle to said bottom surface of said chock.

* * * * *